No. 732,111. PATENTED JUNE 30, 1903.
J. A. PERKINS.
ROLLER BEARING.
APPLICATION FILED AUG. 18, 1900.
NO MODEL.
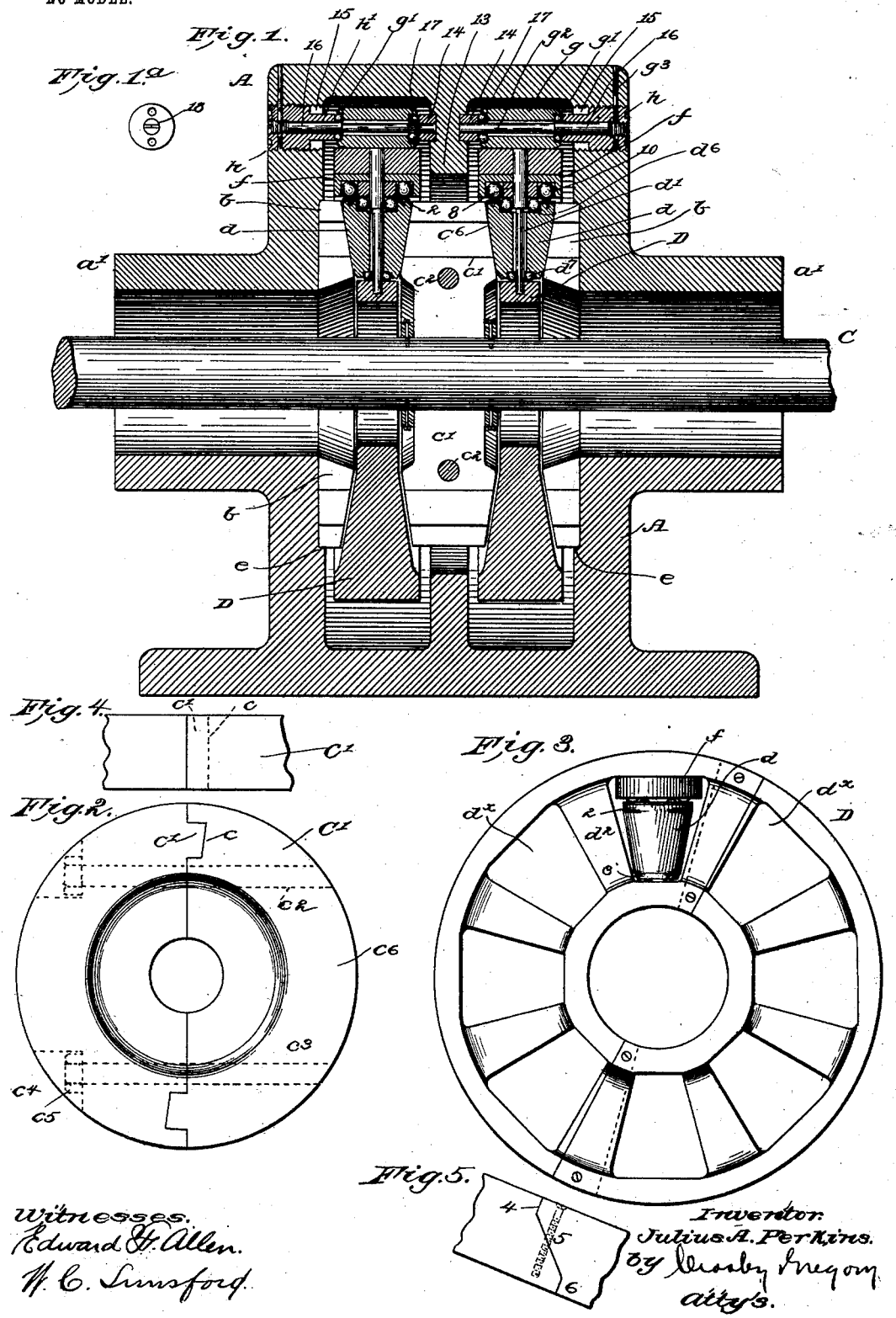
Witnesses.
Edward H. Allen.
W. C. Lunsford.
Inventor.
Julius A. Perkins.
By Crosby Gregory
att'ys.
THE NORRIS PETERS CO., PHOTO-LITHO., WASHINGTON, D. C.

No. 732,111.

Patented June 30, 1903.

UNITED STATES PATENT OFFICE.

JULIUS A. PERKINS, OF OMAHA, NEBRASKA.

ROLLER-BEARING.

SPECIFICATION forming part of Letters Patent No. 732,111, dated June 30, 1903.

Application filed August 18, 1900. Serial No. 27,249. (No model.)

*To all whom it may concern:*

Be it known that I, JULIUS A. PERKINS, a citizen of the United States, residing at Omaha, county of Douglas, State of Nebraska, have invented an Improvement in Roller-Bearings, of which the following description, in connection with the accompanying drawings, is a specification, like characters on the drawings representing like parts.

The invention to be herein described relates to roller-bearings and is illustrated as applied to an end-thrust bearing adapted for use on vessels driven by propellers, the bearing herein to be described being an improvement upon the bearing represented in United States application, Serial No. 29,268, filed on the 7th day of September, 1900. The bearing described in said application presents a series of conical bearing-rollers occupying a substantially radial position between a collar secured to a shaft, which may be a propeller-shaft, and a track, and in practice the pressure exerted upon these conical rollers is very considerable. So to overcome any tendency whatever of these rollers to move outwardly in use under pressure I have added to the construction shown in said application a second set of balls or antifriction devices, they acting upon the end of the flange at the larger end of the conical roller left after forming the chamber in the end of said roller. To further prevent any tendency whatever of the cage carrying the bearing-rollers to move laterally with relation to the longitudinal axis of the propeller or other shaft subjected to end thrust, I have provided the casing surrounding the collar and track and the cage with bearing-rollers sustained therein by antifriction means, and to secure the easy removal of said bearing-rollers I have provided the casing with openings of a greater diameter than the diameter of the bearing-rollers last referred to, so that said bearing-rollers may be removed, in case of necessity, from the casing without at all disturbing the cages sustaining the conical bearing-rollers.

To facilitate the application of my improved bearing to a shaft, I have provided to make the collar and the tracks in two parts, so that they may be slipped onto a shaft already in a ship.

Figure 1 in vertical section represents a casing and traveling cages surrounding a shaft, one-half of the collar and each track being removed, the cylindrical bearing-rollers and the bearings for their spindles being also in section. Fig. 1ª is a detail to be referred to. Fig. 2 shows the collar C' detached. Fig. 3 shows in side elevation one of the traveling cages with a bearing-roller and raceway in working position. Fig. 4 is an edge view of Fig. 2. Fig. 5 is an edge view of Fig. 3.

Referring to the drawings, A represents a casing split longitudinally, as provided for in said application, and surrounding the shaft C, which may have connected with it a propeller to drive a vessel. The shaft C is herein shown as provided with a collar C', made in parts, as best represented in Fig. 2. One part may have a notch, as $c$, and the other part a projection, as $c'$, to enter said notch, and the parts may be united by suitable screws $c^2$ $c^3$, threaded parts of the screws entering threaded holes in one of the parts, the other part having a notch, as at $c^4$, to receive the head $c^5$ of one of the screws. The collar shown has inclined faces $c^6$, which receive against them conical bearing-rollers $d$, which may be substantially such as represented in said application, said bearing-rollers surrounding spindles $d'$, sustained in revolving cages D, said cages having suitable openings $d^\times$, (see Fig. 3,) in which the bearing-rollers are located, the peripheries of said bearing-rollers projecting beyond the dividing-spaces $d^2$ between said openings. Herein, as provided for in said application, the opposite ends of the bearing-rollers are chambered to receive balls $d^6$ and $d^7$, and the exteriors of said bearing-rollers near their opposite ends are reduced in diameter, as at 2 3, to prevent contact of the ends of the rollers with either the inclined faces of the collar C' or of the tracks $b$, there being two such tracks, each sustained against the inner faces of the casing A. That these tracks may be applied to the shaft C when the latter is in position I have made the tracks in two parts. They may be divided, as described of the collar C', and may be slipped into position in the circular cavity made by forming at each side of the casing, within it, a depression, leaving shoulders $e$. The revolving cage is split from one to its other edge, as best represented in Figs. 3 and 5, the cut starting from one side of the cage and running for a short distance, as at 4, substantially at right angles to the one face of the cage, then running diagonally, as at 5, and meeting another substantially right-angled cut 6, and the said cut edges may receive through them a suitable strong screw, as 7, chiefly shown by dotted lines in Fig. 5.

The parts so far described, with the exceptions of the collar, cage, and track, being in two parts, are substantially the same as the parts referred to in my said application.

I have provided in each one of the spaces $d^x$, between the large end of the conical bearing-rollers $d$ therein, a raceway $f$, represented as a circular plate presenting a rim, the center of the plate having a hole to fit the roller-alining means or spindle $d'$. The spindle $d'$ also receives upon it a central bushing 8, and the space between said bushing and the flange of the raceway $f$ receives a series of balls 10, said balls acting against the ends of the flanges at the large end of the rollers $d$, thus affording additional means to resist any tendency of the bearing-rollers to move longitudinally due to the pressure against their sides of the collar and track. I have also as an additional safety and to increase the wearing properties of the bearing-rollers provided the same with hardened-steel tracks 2, held in place by suitable set-screws or other devices, as shown in Fig. 1. To further provide against any possibility of the bearing-rollers moving endwise due to pressure or end thrust on the shaft C, I have surrounded the traveling cage D at suitable intervals, preferably in three places, with cylindrical bearing-rollers $g$, chambered at their ends to receive balls $g'$, the balls contacting with spindles $g^2$, represented as extended through the bearing-rollers and as restrained from rotation by any suitable device—such, for instance, as a pin $g^3$, extended through a suitable hole in the spindle. In order to introduce these bearing-rollers in working position, I have bored the central web 13 of the casing and also the sides of the casing, and in the holes made in the web 13 I have inserted and restrained in any suitable way from rotation suitable bearings 14. The openings 15 made in the sides of the casing are of a diameter greater than the diameter of the bearing-rollers $g$, and said openings are threaded, said openings receiving within them removable bearings $h$, having projecting ends $h'$, the said bearings being bored to receive portions 16 of the spindles $g^2$, said portions being of larger diameter. The balls $g'$ nearest the sides of the casing run on the portions 16 of the spindle of larger diameter, while the balls 17 entering the inner ends of the chambers are slightly larger in diameter, they contacting with a portion of the spindle of a diameter smaller than the portion 16.

The bearing $h$ is provided at its outer ends with suitable pits, as represented best in Fig. $1^a$, to receive suitable projections of a screw-driver or otherwise by which the bearing may be rotated and taken out of the casing when desired, the pin $g^3$ having been previously drawn out, and, if desired, the spindles may be withdrawn from the bearing $h$ and the bearing-rollers by inserting a screw-driver in the slot 18 made in the ends of the spindle. (See Fig. $1^a$.) When inspecting the bearing, the spindle may be readily withdrawn to see whether or not it is worn, and if it should happen that the balls $g'$ have in their rotation about the spindle thrown up a bur which impedes the withdrawal of the spindle then in such case the inspector will also engage and turn out the bearing $h$.

In practice the chambers in the ends $a'$ of the casing will receive cylindrical roller-bearings, as provided for in said application, and, if desired, I may also place within the space at the interior of the traveling cage and the exterior of the shaft other cages containing bearing-rollers, as provided for in said application.

I believe that I am the first to make a traveling cage with a smooth and circular periphery and to coact with the periphery of the cage-roller bearings to thereby arrest any tendency of the cage to move laterally with relation to the longitudinal axis of the shaft due to end-thrust pressure against the sides of the conical bearing-rollers, and consequently my invention in this particular is not limited to the exact devices shown and employed for sustaining said bearing-rollers; but instead I may employ any other usual or suitable equivalent mode of sustaining the bearing-rollers.

Having described my invention, what I claim as new, and desire to secure by Letters Patent, is—

1. In a bearing, a collar composed of a plurality of parts and each part presenting beveled faces, said parts being provided respectively with notches and tenons at their meeting ends, and means to clamp the parts of the collar together upon the shaft.

2. In a bearing, a traveling cage having a series of spaces, roller-alining means, a series of rollers in said spaces, antifriction means interposed between said rollers and alining means, and a separate antifriction means comprising a series of balls in said spaces against which the larger ends of said rollers rest and travel.

3. In a bearing, a casing, a shaft extended through said casing and provided with a collar movable with said shaft, tracks fixed with relation to said casing, and a two-part traveling cage located between said collar and track, and surrounding said shaft with a free and unobstructed space between them, said cage having a series of spaces, combined with a series of conical rollers and antifriction means sustaining said rollers within said spaces.

4. In an end-thrust bearing, a shaft, a collar having an acting face, a casing, a track sustained by said casing, a traveling cage interposed between said collar and track and having a series of openings, a series of conical bearing-rollers, antifriction means sustaining said rollers in said cage, a raceway in each of said openings, and a set of balls in said raceway and contacting with the larger flanged ends of each of said rollers.

5. In a roller-bearing, a traveling cage having a series of spindles, a series of bearing-rollers surrounding said spindles and chambered at their ends to form flanges, antifriction means located in the chambers at each end of said rollers and interposed between the rollers and spindles and balls interposed between the face of each flange at the larger end of each of said rollers and the raceways surrounding said spindles.

6. In a roller-bearing, a shaft, a collar carried thereby, a casing surrounding said collar, a track sustained in said casing and opposed to said collar, a traveling cage interposed between said collar and the track and provided with conical bearing-rollers, antifriction means sustaining said bearing-rollers in said cage, and a series of bearing-rollers located in said casing and against which the circular periphery of the traveling cage moves in its rotation with the shaft.

7. In a roller-bearing, a shaft, a collar carried thereby, a casing surrounding said collar, a track sustained in said casing and opposed to said collar, a traveling cage interposed between said collar and track and provided with conical bearing-rollers, antifriction means sustaining said conical bearing-rollers at each end in said cage, a series of bearing-rollers against which the periphery of said cage travels, and antifriction means sustaining said bearing-rollers in said cage.

8. In a roller-bearing, a casing, a shaft having a collar fixed to it, a track mounted in said casing, a traveling cage interposed between said collar and track and having a series of conical bearing-rollers, combined with bearing-rollers against which the periphery of said cage contacts, said casing being provided with means whereby said bearing-rollers may be inserted in working position from the outer side of said casing.

9. In a roller-bearing, a casing bored from its outer side, the bore being of greater diameter than the bearing-rollers to be put into working position through said bore, combined with a bearing-roller, a spindle, and a bearing, the spindle centering and alining the bearing-roller, the bearing sustaining the outer end of the spindle.

10. In a roller-bearing, a casing, a shaft having a collar fixed to it, a track mounted in said casing, a traveling cage interposed between said collar and track and having a series of conical bearing-rollers, the casing having holes parallel to said shaft, and bearing-rollers of a diameter less than the diameter of said holes, and means to sustain said bearing-rollers in position in said casing that the periphery of the traveling cage may be sustained by said bearing-rollers.

11. In a roller-bearing, a casing, a spindle, a surrounding bearing-roller flanged at its ends, balls inserted in the ends of said rollers and contacting with said spindle, and a removable bearing sustained by said casing and bored to receive one end of said spindle.

12. In a roller-bearing, a casing, a spindle, a surrounding bearing-roller flanged at its ends, balls inserted in the ends of said rollers and contacting with the spindle, and a removable bearing-screw threaded at its periphery and engaging screw-threads of the casing.

13. In a roller-bearing, a casing, a spindle, a surrounding bearing-roller flanged at its ends, balls inserted in the ends of said rollers and contacting with said spindle, and a removable bearing sustained by said casing and bored to receive one end of said spindle, and means to restrain the rotation of said bearing in said casing.

In testimony whereof I have signed my name to this specification in the presence of two subscribing witnesses.

JULIUS A. PERKINS.

Witnesses:
GEO. W. GREGORY,
MARGARET A. DUNN.